United States Patent [19]
Kawara et al.

[11] Patent Number: 5,508,946
[45] Date of Patent: Apr. 16, 1996

[54] ELECTRONIC BALANCE DISPLAYING WEIGHTS IN SELECTED UNITS

[75] Inventors: Toshio Kawara; Ken Uesaka, both of Kyoto, Japan

[73] Assignee: Shimadzu Corporation, Japan

[21] Appl. No.: 378,982

[22] Filed: Jan. 24, 1995

Related U.S. Application Data

[63] Continuation of Ser. No. 6,610, Jan. 21, 1993, abandoned.

[30] Foreign Application Priority Data

Feb. 26, 1992 [JP] Japan .................................. 4-039332

[51] Int. Cl.⁶ .................................................. G01G 19/38
[52] U.S. Cl. .................. 364/567; 364/464.01; 364/466; 364/715.05; 177/25.11; 177/25.13; 177/25.14
[58] Field of Search ............................... 364/464.01, 466, 364/404, 405, 715.05, 567; 177/25.1–25.19; 395/161

[56] References Cited

U.S. PATENT DOCUMENTS

| | | | |
|---|---|---|---|
| 4,204,197 | 5/1980 | Loshbough et al. ................... | 364/466 |
| 4,379,495 | 4/1983 | Cocks et al. .......................... | 364/466 |
| 4,412,591 | 11/1983 | Reichmuth et al. ................... | 364/466 |
| 4,595,984 | 6/1986 | Daniels ................................ | 364/466 |
| 4,796,212 | 1/1989 | Kitagawa ............................. | 177/25.11 |
| 4,853,881 | 8/1989 | Yamada .............................. | 177/25.11 |
| 4,958,693 | 9/1990 | Muraoka et al. .................... | 177/25.17 |
| 4,967,383 | 10/1990 | Hirano et al. ....................... | 177/25.15 |
| 4,967,384 | 10/1990 | Molinar et al. ..................... | 177/25.12 |
| 5,024,282 | 6/1991 | Raikes et al. ....................... | 177/25.15 |
| 5,076,375 | 12/1991 | Dillon et al. ....................... | 177/25.19 |
| 5,101,368 | 3/1992 | Kaplan .............................. | 364/715.05 |
| 5,131,482 | 7/1992 | Davis et al. ....................... | 177/25.14 |
| 5,174,400 | 12/1992 | Hasegawa et al. ................. | 177/25.13 |
| 5,191,533 | 3/1993 | Haug ................................ | 177/25.15 |

*Primary Examiner*—Emanuel T. Voeltz
*Assistant Examiner*—Hal D. Wachsman
*Attorney, Agent, or Firm*—Majestic, Parsons, Siebert & Hsue

[57] ABSTRACT

An electronic balance, capable of displaying a weight value in different units, includes a first memory device for storing a plurality of units which can be selected, a menu key for causing the contents of the first memory device to be sequentially displayed, a registration key for causing any unit being displayed by the operation of the menu key to be registered in a second memory device, and a unit switch key for sequentially calling the units stored in the second memory device and causing the display of a weight value in the unit which has been called.

4 Claims, 3 Drawing Sheets

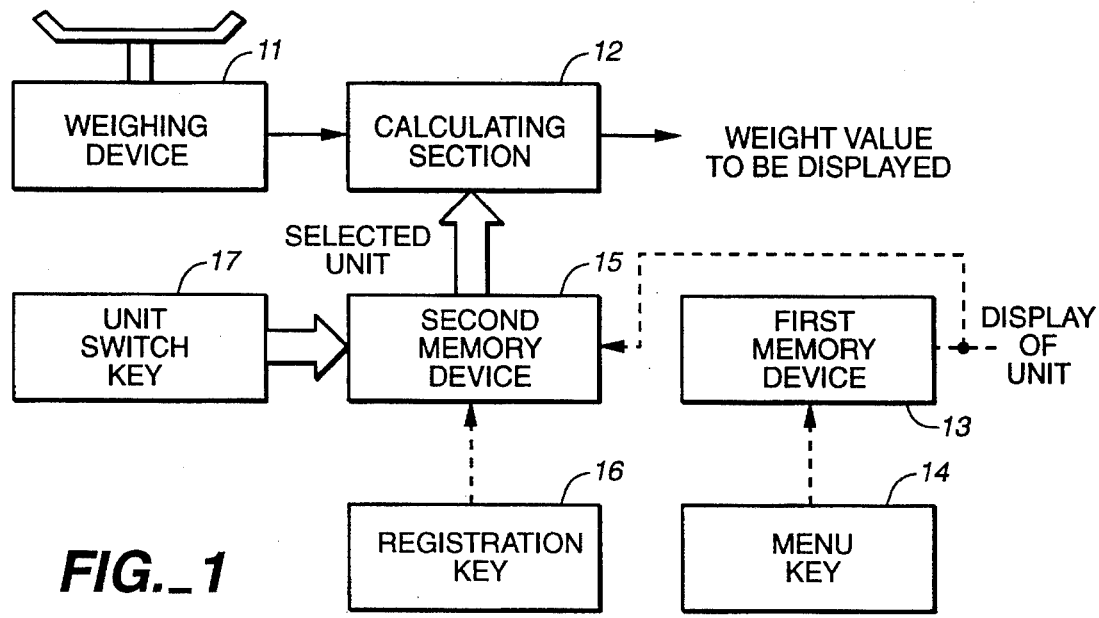
FIG._1
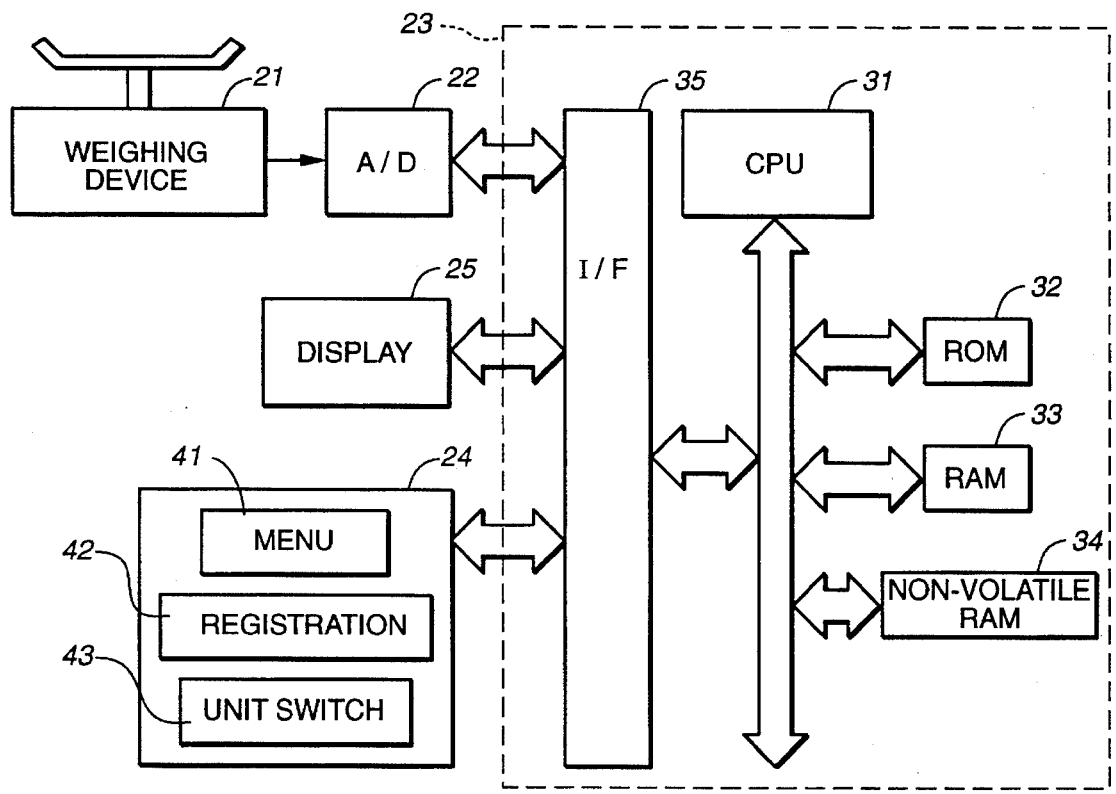
FIG._2

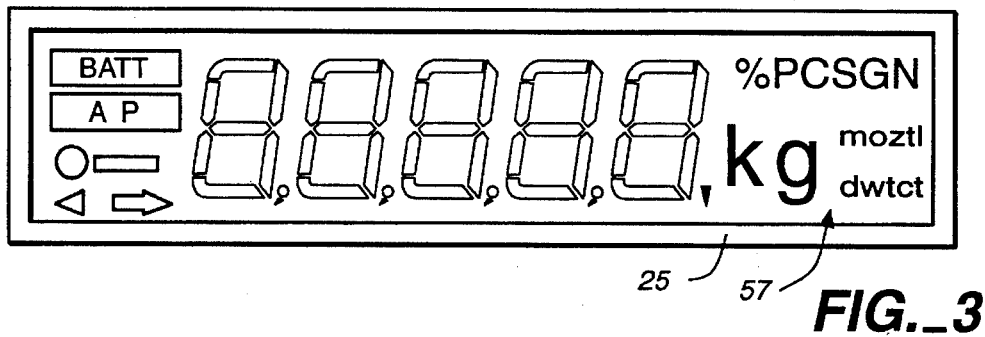
FIG._3
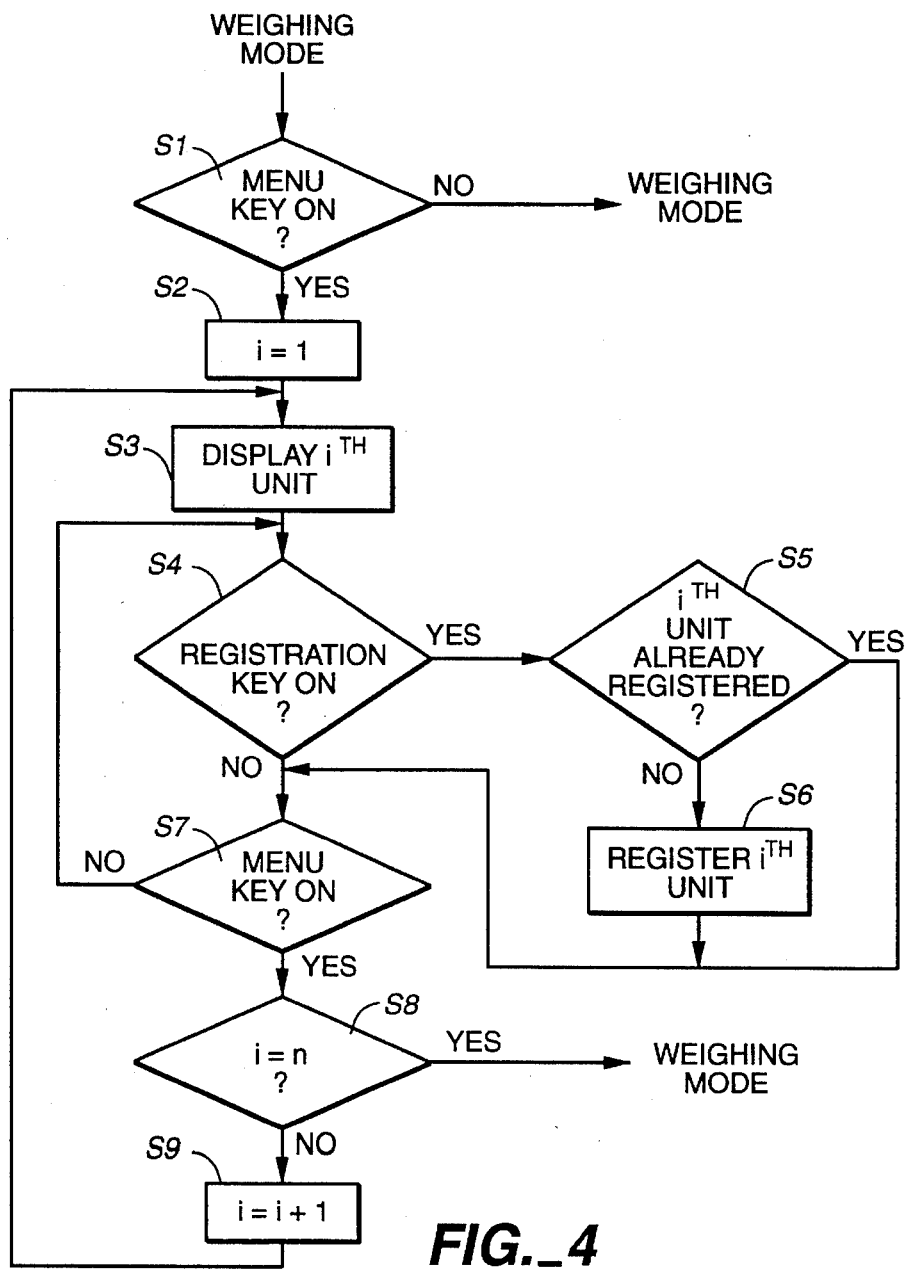
FIG._4

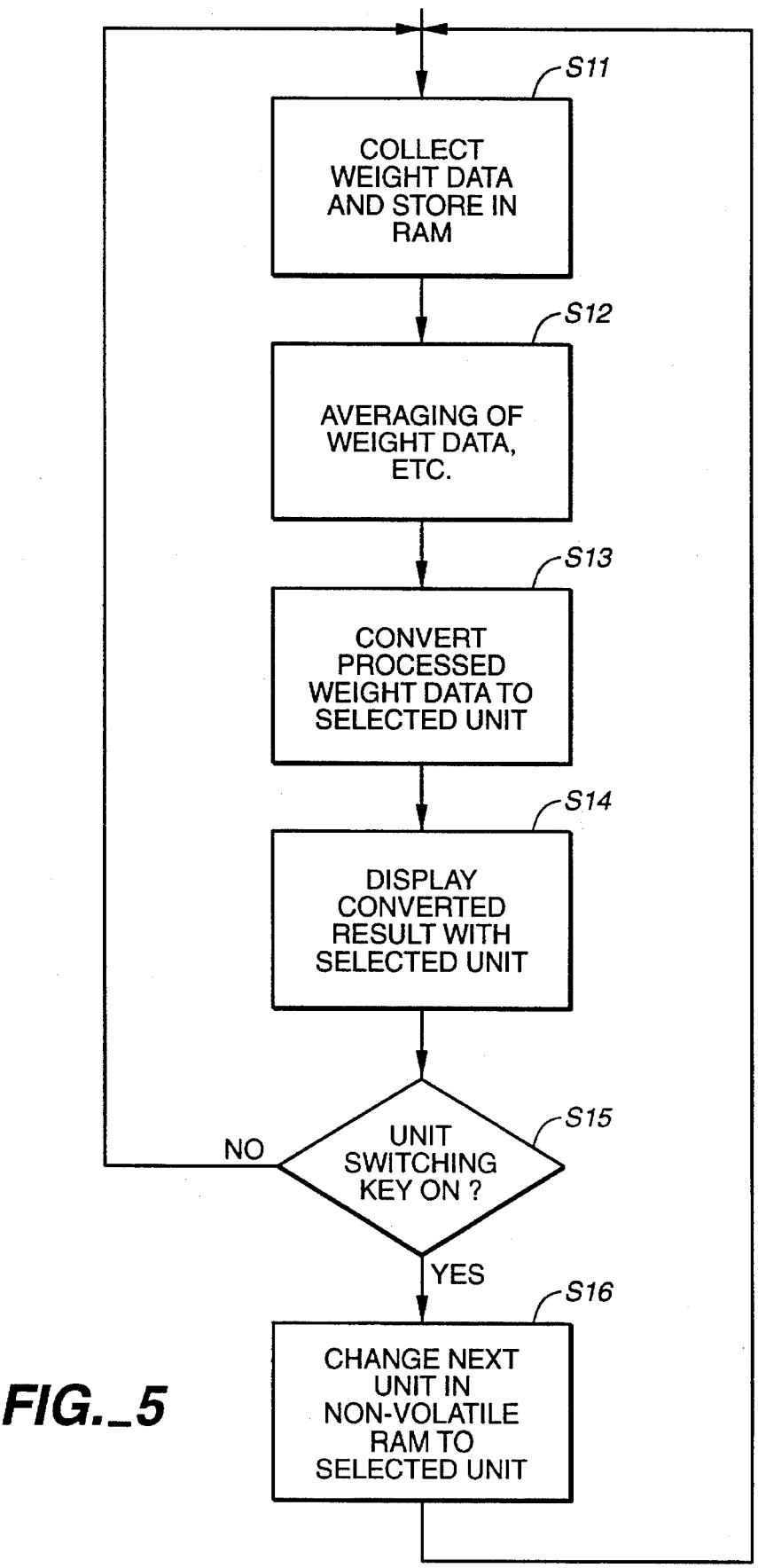
FIG._5

ELECTRONIC BALANCE DISPLAYING WEIGHTS IN SELECTED UNITS

This is a continuation of application Ser. No. 08/006,610 filed Jan. 21, 1993, now abandoned.

BACKGROUND OF THE INVENTION

This invention relates to an electronic balance and, more particularly, to an electronic balance capable of displaying a measured weight value in any unit selected from a plurality of different units.

An electronic balance of this kind usually has a plurality of conversion formulas stored in a read-only memory for converting weight data into a plurality of units and obtains a value to be displayed by using the formula corresponding to the selected one of these units. The method of switching units or selecting one of them on such an electronic balance may be hardware-based such as the method of using dip switches and the method of providing a separate switch for each unit, or software-based such as the method of operating a menu selection key to cause the units stored in a memory device to be displayed sequentially and operating another key while the desired unit is being displayed to thereby make the selection. Although the number of selectable units are increased on such an electronic balance for improved usefulness, users in ordinary business usually do not use all of the available units. Most users tend to merely switch among a relatively small fraction of the available units.

From this perspective, let us reconsider the prior art methods of switching units described above. As the number of selectable units becomes large, the operation for switching units becomes troublesome by the method of using dip switches or a menu selection key. If separate keys are to be provided to individual units, on the other hand, an increased number of keys will be required and this results in high costs of manufacturing. Errors are likely to occur especially with the method of assigning individual keys when units are switched in a series of measurements for the same sample.

It is therefore an object of the present invention to provide an electronic balance with which the user can easily switch units or select a unit without making errors.

SUMMARY OF THE INVENTION

With reference to FIG. 1 which illustrates the basic concept of the present invention for accomplishing the above and other objects, an electronic balance displays weight information received from a weighing device 11 by converting it into a weight value in its calculating section 12. The balance comprises a first memory device 13 for storing a plurality of units, a menu key 14 for causing the data stored in the first memory device 13 to be sequentially displayed, a second memory device 15, a registration key 16, which is to be operated while a unit is being displayed as a result of operating the menu key 14, for causing the unit being displayed to be registered in the second memory device 15, and a unit switch key 17. The electronic balance embodying the present invention is characterized as being so structured that, whenever this unit switch key 17 is operated, only the units which are registered in the second memory device 15 are sequentially called and become the unit in which the weight value to be displayed is calculated in the calculating section 12.

By operating the registration key 16 as the plurality of units stored in the first memory device 13 are sequentially displayed, it is possible to cause only selected ones of the units in the first memory device 13 to be registered in the second memory device 15. If the unit switch key 17 is operated thereafter, only the units then registered in the second memory device 15 are sequentially called to have the weight values displayed in these units. In other words, when units are to be switched, the user is not required to pick the next desired one out of all the units stored in the first memory device 13. Instead, only a relatively few units with higher probabilities of being used may be preliminarily registered in the second memory device 15. In this manner, the switching of units is effected by operating the unit switch key 17 and thereby sequentially calling only those of the units stored in the second memory device 15. Consequently, although there may be a large total number of units originally provided in the first memory device 13, the user can choose only a relatively few of those which are likely to be used, thereby accomplishing the object of the present invention.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a conceptual diagram showing the structure of an electron balance embodying the present invention;

FIG. 2 is a block diagram of an electronic balance embodying the present invention;

FIG. 3 is a front view of the display device of the electronic balance of FIG. 2;

FIG. 4 is a flow chart of a part of a program stored in the ROM for the unit registration mode of operation in which selected units are registered; and FIG. 5 is a flow chart of another part of the program in the ROM for the weighing mode of operation.

DETAILED DESCRIPTION OF PREFERRED EMBODIMENT

With reference to the block diagram of FIG. 2, a weight-indicating signal outputted from a weighing device 21 is converted into a digital signal by an A-D converter 22 and is then received by a control device 23, which includes a central processing unit (CPU) 31, a read-only memory (ROM) 32, a random-access memory (RAM) 33, a non-volatile RA24 34 and an input/output interface 35. In addition to the A-D converter 22, a key operation device 24 and a display device 25 are also connected to the control device 23 through the input/output interface 35. The ROM 32 stores therein not only the programs to be described below but also a plurality of units which can be selected and conversion formulas therefor. The non-volatile RAM 34 has areas set for the storage of units to be registered therein in the unit registration mode of operation to be described below.

The key operation device 24 is provided not only with keys of the usual kind (not shown) found on prior art electronic balances such as the tare weight subtraction key and the zero point adjustment key, but also with a menu key 41, a registration key 42 and a unit switch key 43. The display device 25 is a digital display apparatus with a plurality of digits for displaying a weight value transmitted from the control device 23. As shown in FIG. 3, its front surface includes a unit display area 51 near the lowest digit for displaying a symbol corresponding to one of the plurality of selectable units, such as "kilogram", "gram", "ounce", "troy ounce", "pennyweight", "carat", "Momme" (a Japanese weight unit), "tael" and "grain" by switching on corresponding lamps.

Next, the flow charts of FIGS. 4 and 5 will be referenced for the explanation of the programs stored in the ROM 32 for the routines to be carried out when units are registered or at the time of weighing an object.

When units are to be registered, the user selects the unit registration mode of operation by pressing the menu key 41 (Yes in Step S1). Let us assume now that there are n units that are written in the ROM 32 and can be shown in the unit display area 51. They are sequentially shown one at a time on the display device 25 (S3) every time the menu key is pressed (YES in S1 or S7). For this purpose, dummy variable i is initially set to 1 (S2) and is incremented by 1 (S8) after each unit stored in the ROM 32 is displayed. If the registration key 42 is pressed (YES in S4) while the ith unit is being displayed, the ith unit is registered to the non-volatile RAM 34 (S6), provided it has not been registered yet (NO in S5). After all of the n units have been thus displayed (Yes in S8) to give the user the chance to register, the unit registration mode of operation is automatically concluded and the system returns to the weighing mode of operation (to be described below). The order in which selected units are registered in the non-volatile RAM 34 is the same as that in which the units are registered by the registration key 42.

In the weighing mode of operation, units can be switched as shown in FIG. 5 by pressing the unit switch key 43 (S15). In this mode of operation, not only does the unit display area 51 of the display device 25 display the symbol corresponding to the currently selected unit (S14), but weight data from the weighing device 21 are normally sampled for each of specified time intervals and stored in the RAM 33 (S11) and, after an averaging process is carried out on a specified number of the newest data (S12), the weight value is converted into the currently selected unit and displayed on the display device 25 in this unit (S13).

If it is desired to switch units, the user presses the unit switch key 43 (YES on S15). Whenever the unit switch key 43 is pressed, the next unit which is registered in the non-volatile RAM 34 is displayed in the unit displaying area 51 in the order in which they were registered, and a weight value is calculated in the newly displayed unit and displayed on the display device 25 (S16). If the unit switch key 43 is pressed while the last of the registered units is being selected, the first of the registered units is selected.

According to the present invention, even if a large number of units and correspondingly many conversion formulas are stored in the ROM 32, the user can preliminarily register only selected ones of them in the non-volatile RAM 34 in any desired order. In the weighing mode of operation, the user has only to press the unit switch key 43 to switch the units in the same order. When it is desired to weigh the same sample in three different units, for example, the user can preliminarily register these units in the desired sequence in the registration mode of operation. After the mode of operation is switched to the weighing mode, the sample can be left on the weighing tray while the user causes its weight to be displayed in the first selected unit, and the unit switch key 43 is pressed so as to make the next display in the second selected unit. By pressing the unit switch key 43 once again, the weight is displayed in the third selected unit. In this manner, the work required for switching units can be simplified and the errors can be reduced.

Although the present invention has been described above with reference to only one example, this example is not intended to limit the scope of the invention. Many modifications and variations thereon are possible within the scope of the invention. For example, the sequence in which units are registered to the non-volatile RAM 34 need not be the same as the sequence in which they are registered by the operations of the registration key as explained above. Similarly, the sequence in which registered units are called by operating the unit switch key 43 need not be the same as the sequence of registration to the non-volatile RAM 34. An order of priority may be separately established among the units by considering which ones are easy to use, for example, such that even if registration is effected in a random sequence, the units are called in the order of priority. It also goes without saying that the menu key, the registration key and the unit switch key may be called by any other names as long as they possess the functions described above.

In summary, the contents of the first memory device storing all of a large number of selectable units are sequentially displayed as the menu key is pressed, and selected ones of these units are registered in the second memory device as the registration key is pressed while each of the selected units is being displayed. When it is desired to switch the units, only those of the units registered in the second memory device are sequentially displayed as the unit switching key is operated. Thus, although a large number of units may be contained in the first memory device, the user picks and chooses from them only those that are desired and registers them in the second memory device. In this manner, the user has only to operate one key to call them sequentially. Thus, the operation for switching units is significantly simplified and the probability of causing input errors is also significantly reduced. From the point of view of hardware implementation, the present invention may be characterized as reducing the number of keys, and thereby contributing to the economical advantage.

What is claimed is:

1. An electronic balance comprising:
   a weighing device for weighing objects and outputting weight signals indicative of the weights of said objects;
   an analog-to-digital converter for converting said weight signals into digital signals;
   display device for displaying data thereon, said display device including a unit display area;
   a control device including a first memory device storing a plurality of units and a second memory device for registering only selected ones of said units; and
   input means for allowing a user to select different modes of operating said control device, said input means including a menu key, a registration key and a unit switch key;
   said control device being adapted to cause said plurality of units to be displayed sequentially one at a time in said unit display area on said display device if said menu key is operated, to register any one of said sequentially displayed units in said second memory device if said registration key is operated simultaneously with the display thereof on said display device, and to sequentially call said registered units in said second memory device if said unit switch key is operated;

said control device serving to receive said digital signals, to calculate weight values from said digital signals in selected one of said units called by said unit switch key, and to cause said weight values and said selected unit to be displayed on said display device.

2. The electronic balance of claim 1 wherein said second memory device includes a non-volatile RAM.

3. The electronic balance of claim 1 further comprising a RAM for storing data outputted from said weighing device.

4. The electronic balance of claim 3 wherein said control device calculates said weight values by averaging on said data outputted from said weighing device.

* * * * *